(12) United States Patent
Svabek et al.

(10) Patent No.: US 7,341,162 B2
(45) Date of Patent: Mar. 11, 2008

(54) IN-FRAME WIRE FRY BASKET WITH ERGONOMIC HANDLE

(75) Inventors: Lawrence J. Svabek, Orland Park, IL (US); Leonard J. Svabek, Orland Park, IL (US); Richard J. Svabek, Lemont, IL (US)

(73) Assignee: Archer Wire International Corporation, Bedford Park, IL (US)

( * ) Notice: Subject to any disclaimer, the term of this patent is extended or adjusted under 35 U.S.C. 154(b) by 593 days.

(21) Appl. No.: 11/015,075

(22) Filed: Dec. 17, 2004

(65) Prior Publication Data

US 2005/0268791 A1    Dec. 8, 2005

Related U.S. Application Data

(63) Continuation-in-part of application No. 10/862,713, filed on Jun. 7, 2004.

(51) Int. Cl.
*B65D 6/08* (2006.01)
*A47J 37/12* (2006.01)

(52) U.S. Cl. .................... 220/485; 220/755; 99/411
(58) Field of Classification Search ............. 220/485, 220/491, 755; 99/411, 413, 416
See application file for complete search history.

(56) References Cited

U.S. PATENT DOCUMENTS

| | | | | | |
|---|---|---|---|---|---|
| 2,112,990 | A | * | 4/1938 | Hunter | 248/94 |
| 2,658,444 | A | * | 11/1953 | Wheeler | 99/410 |
| 4,189,993 | A | * | 2/1980 | Kaufman | 99/403 |
| 5,992,306 | A | * | 11/1999 | Chiang | 99/411 |

* cited by examiner

*Primary Examiner*—Anthony D. Stashick
*Assistant Examiner*—Harry A Grosso
(74) *Attorney, Agent, or Firm*—Ladas & Parry LLP

(57) ABSTRACT

A rigid wire frame is formed around the exterior of a wire mesh fry basket. An ergonomic handle having at least one protuberance enables a person to firmly grip the handle with less muscle strength than is required to grip a straight handle. A rigid wire hook, opposite a rigid wire handle enables the basket to be hung from an edge.

28 Claims, 5 Drawing Sheets

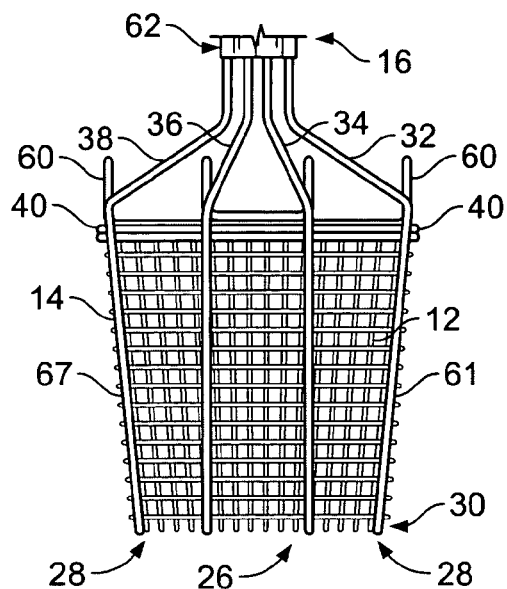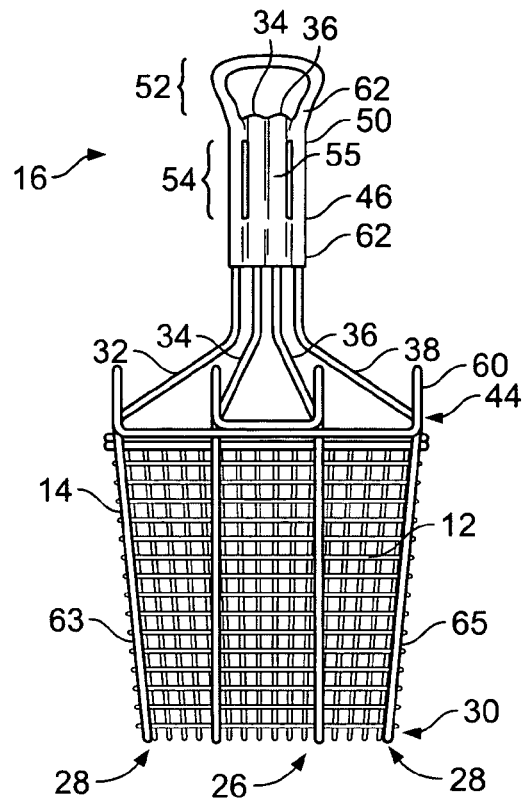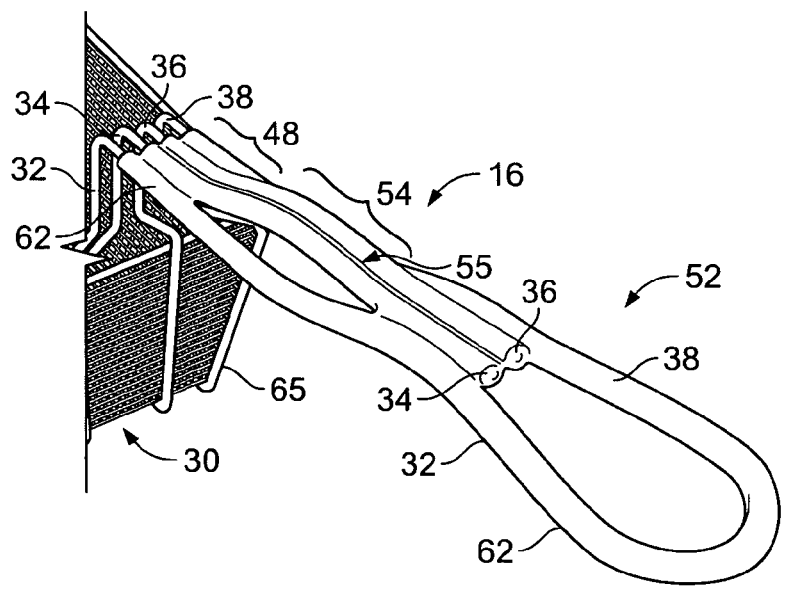
FIG. 3
FIG. 4
FIG. 5

IN-FRAME WIRE FRY BASKET WITH ERGONOMIC HANDLE

CROSS REFERENCE TO RELATED APPLICATION

This is a continuation-in-part of U.S. patent application Ser. No. 10/862,713, for an In-Frame Wire Fry Basket, which was filed on Jun. 7, 2004.

BACKGROUND OF THE INVENTION

Wire mesh baskets are commonly used in restaurants to deep fry food. Prior art wire fry baskets are comprised of three components: a relatively fine-mesh wire basket; a frame to which the mesh basket is attached and a handle by which the mesh basket, suspended on the frame, can immersed into and removed from a hot oil bath. Such baskets have been used for years and are nearly ubiquitous in restaurants and food service institutions.

A problem with prior art wire baskets used to deep fry foods is the susceptibility of the fine wire mesh basket that holds food, to damage. Because the prior art mesh baskets' sides and corners are unprotected, prior art mesh basket corners can be bent or dented if the basket is dropped or otherwise handled improperly. Some prior art wire baskets that are used to deep fry foods are also somewhat difficult to handle when loaded. A basket handle that enables a user to handle a loaded basket would be an improvement over the prior art.

SUMMARY OF THE INVENTION

An improved wire fry basket has a fine wire mesh basket that is protected by a rigid wire frame that is formed from stiff, heavy gauge wire. The rigid wire frame protects the fine wire mesh basket by providing stiff, rigid wires that run along the outside of each corner of the wire mesh basket. The stiff, rigid wires of the rigid wire frame are able to absorb impacts that would damage the wire mesh basket.

The wire fry basket has an ergonomic handle with a curtate trochoid-shaped protuberance located near the second end of the handle. The curtate trochoid-shaped protuberance that rises to meet a user's thumb, allows a user to more firmly grasp the handle and better-manipulate the basket. The ergonomic handle is attached to one end or side of the rigid wire frame enabling the rigid wire frame and wire mesh basket to be more easily lowered into and lifted out of, a deep fryer.

The wire fry basket also has at least one rigid-wire hook attached to the frame where opposite the handle. The hook enables the basket to be hung over a side wall of a deep fryer.

The rigid wire hook, the rigid wire frame and the handle are preferably formed from the same rigid wire. The term "rigid wire" includes a solid, round bar stock. The term "rigid wire" includes a tube, and rectangular or square-cross section bar stock.

As used herein, a "curtate trochoid" means a path followed by a point fixed with respect to a circle, but with its circumference, when the circle rolls along a straight-line distance without slipping. As used herein the term "curtate troichoid" includes and encompasses a "cycloid," which is a path followed by a point on the circumference of a circle, which rolls along a straight line without slipping. Depending on the length of a "curtate trochoid" and the diameter of the circle by which its formed, and the point of the circle from which the curtate trochoid is formed, a curtate trochoid curve can resemble or approximate a portion of an ellipse. It can also resemble or approximate a portion of a parabola, as well as a portion of a circle. The term "curtate trochoid" also includes the exterior curve of a curtate trochoid.

As used herein, a curtate trochoid opens "downwardly" if the open side of the curve faces downward. A curtate trochoid opens "upwardly" if the open side of the curve faces upward.

BRIEF DESCRIPTION OF THE DRAWINGS

FIG. 3 shows an end-view of the basket shown in FIGS. 1 and 2, as seen from the handle-end of the basket.

FIG. 4 shows an end view of the basket as seen from the hook end of the basket and looking toward the handle.

FIG. 5 is an enlargement of the handle, showing the handle contour.

DETAILED DESCRIPTION OF THE PREFERRED EMBODIMENTS

Figure 1:
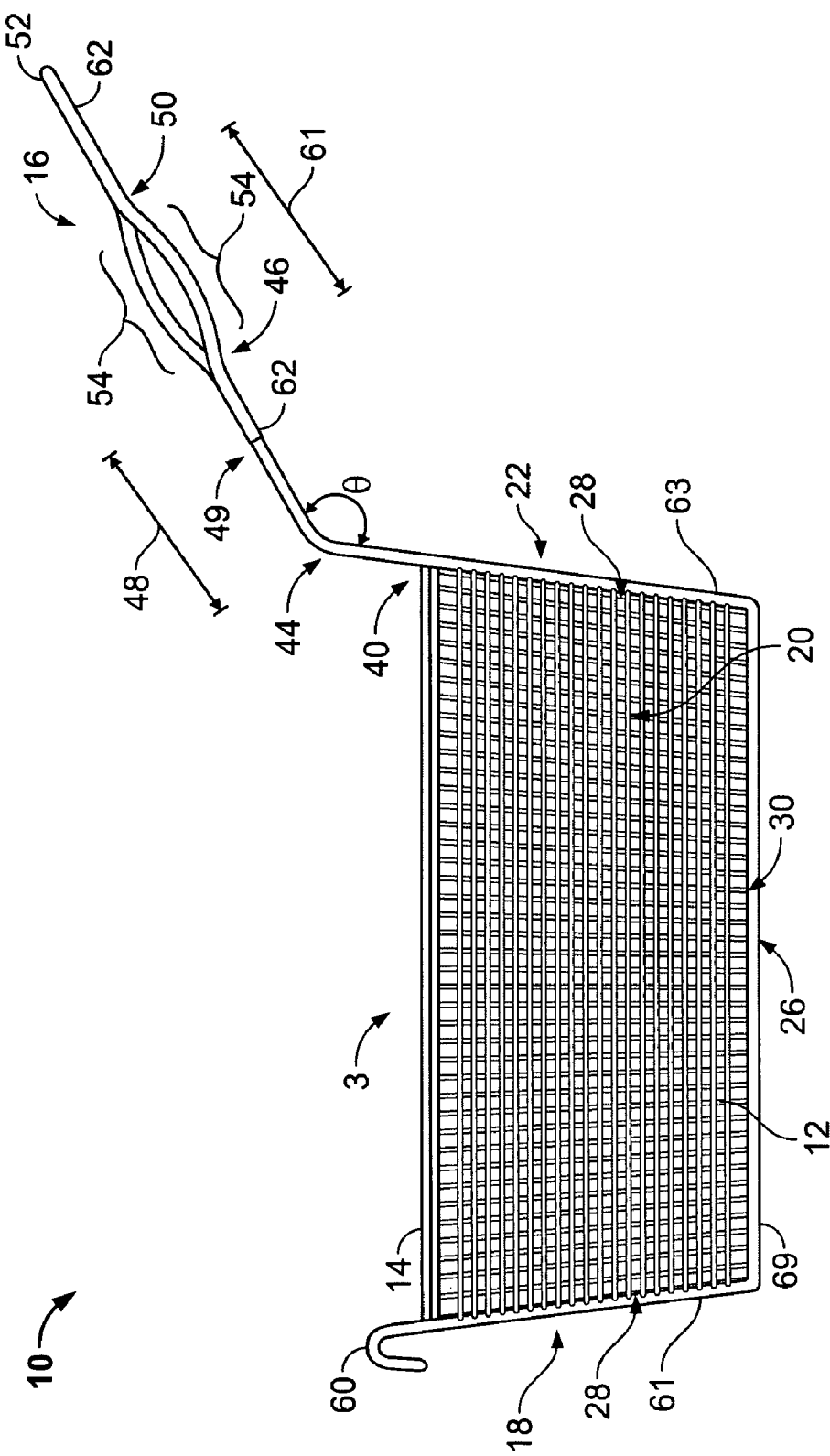
FIG. 1 shows a side view of a fry basket.
Figure 2:
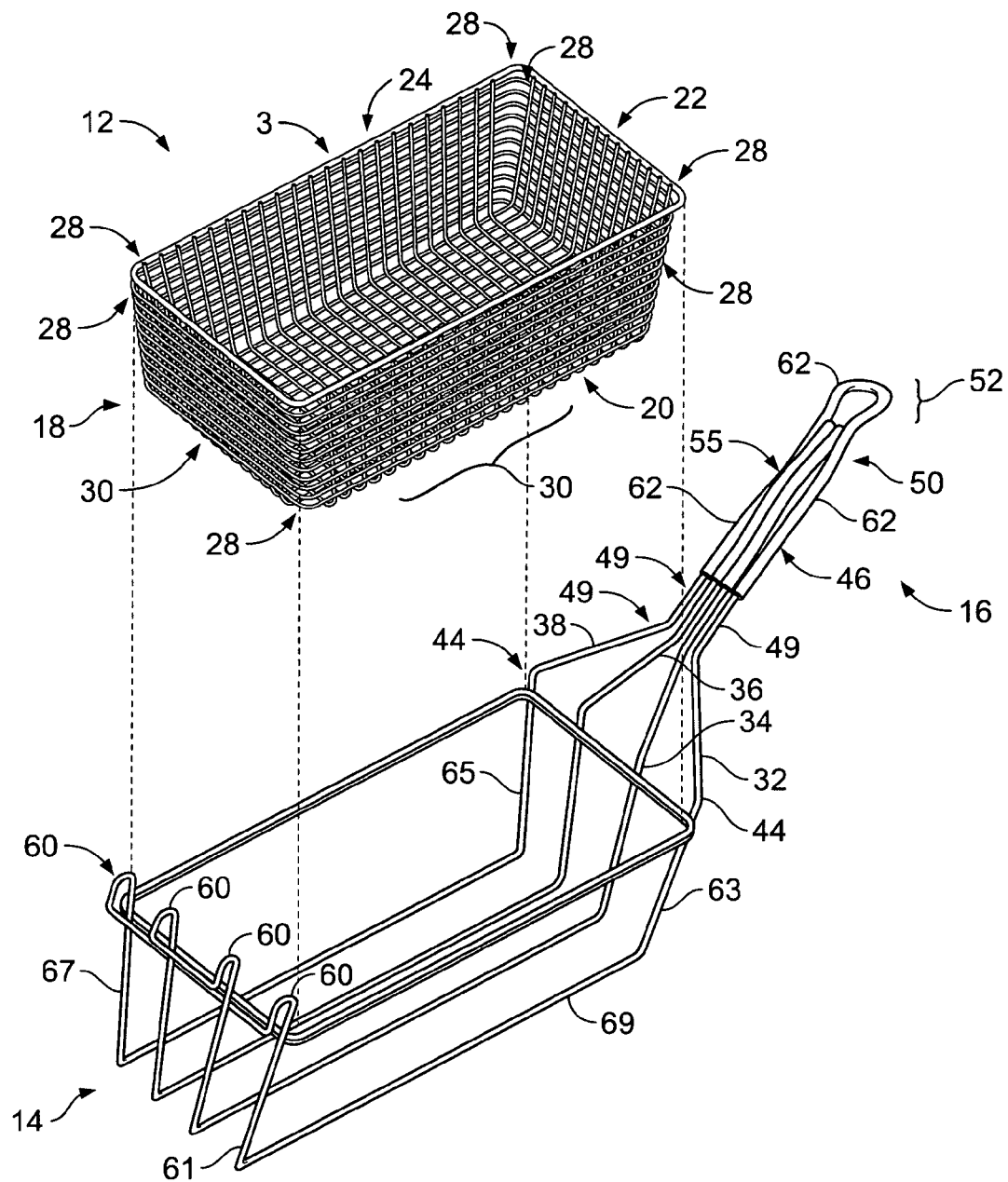
FIG. 2 shows an exploded view of an in-frame wire fry basket.

FIG. 1 shows a side view of an in-frame, wire fry basket 10. The wire fry basket 10 is comprised of a relatively close-weave wire mesh basket 12 that holds foods to be deep fried. The wire mesh basket 12 is supported and protected by a rigid wire frame 14 that is sized, shaped and dimensioned to wrap around the outside of the wire mesh basket 12. A rigid wire handle 16 allows the frame 14 and basket 12 to be lowered into and lifted out of a deep fryer, not shown in the figures but well-known to those of ordinary skill in the art. A rigid wire hook 60, which is attached to the rigid wire frame 14 opposite the handle 16, enables the wire fry basket 10 to be hung from the edge of a deep fryer or other device. As best seen in FIG. 2, the top 3 of the wire mesh basket 12 is open so that foods can be added to and removed from the basket's interior.

FIG. 3 shows an end view of the wire fry basket 10, as it appears looking at the wire fry basket 10 from the rigid wire hook 60 end. FIG. 4 shows an opposite end view of the wire fry basket 10, as it appears from the wire handle 16 of the basket 10.

As best seen in FIG. 2, the wire mesh basket's 12 shape and the rigid wire frame's 14 shape is an inverted frusto-pyramid, allowing several fry baskets 10 to be stacked for shipping, storage and cleaning. The frusto-pyramid shape requires the wire mesh basket 12 to have four sides 18, 20, 22 and 24 and a bottom 26, each of which is formed of the same relatively fine-pitch wire screen, the physical specifications of which are well known to those of ordinary skill in the art.

The wire mesh basket 12 has a width that is measured across the wire mesh basket 12 orthogonal to the length of the handle 16. The wire mesh basket 12 also has a length, measured in a direction that is parallel to the length of the handle, i.e., from where the handle 16 is attached to the frame 14 to the end of the frame 14 where the hook 60 is located.

As can be seen in FIG. 2, each pair of adjacent sides 18, 20, 22, 24 of the wire mesh basket 12 intersect to form a substantially vertical corner 28 of the wire mesh basket 12. A horizontal corner 30 of the wire mesh basket 12 is formed where each side 18, 20, 22, 24 intersects the bottom 26. The wire mesh basket shown in FIG. 2 is therefore considered to have four vertical corners 28 and four horizontal corners 30.

Still referring again to the exploded view of FIG. 2, it can be seen that the wire mesh basket 12 is supported by the rigid wire frame 14. As the frame 14 is constructed and arranged however, the rigid wire frame 14 also protects the corners 28 and 30 of the wire mesh basket 12 from damage that would otherwise dent the wire mesh basket 12. The rigid wire frame 14 protects the wire mesh basket 12 corners 28 and 30 by rigid wire frame segments 61, 63, 65, 67 and 69 that are sized, shaped and arranged to be proximate to corresponding corners 28 and 30 of the wire mesh basket 12 when the wire mesh basket 12 is installed into the frame 14.

As used herein, "proximate" means that corners 28 and 30 of the wire mesh basket 12 are within the rigid wire frame 14 and sufficiently close to a nearby rigid wire segment, 61, 63, 65, or 67 for instance, such that the nearby rigid wire frame segment will protect the rigid wire segment's nearby corner 28 or 30 from impacts.

As shown in FIGS. 1, 2, 4, 5 and 7, the fry basket 10 has an ergonomic handle 16 provided by a contour in the handle, the shape of which allows a person to grasp the handle more easily. As best shown in FIG. 2 and FIG. 5, the preferred embodiment of the handle 16 is formed of four separate rigid wires 32, 34, 36 and 38, each of which is considered to be a "rigid wire" because it is of a sufficiently heavy gauge and composition to make it substantially rigid or inflexible when it supports loads that are normally carried in the fry basket 10.

As shown in FIG. 1 and FIG. 2, each of the four rigid wires 32, 34, 36 and 38 that make up the handle 16 are attached to the rigid wire frame 14, preferably by welding, along one section 40 of the rigid wire frame 14. Inasmuch as the four separate rigid wires 32, 34, 36 and 38 that make up the handle each carry a part of the basket load, the end of each wire 32, 34, 36 and 38 that is attached to the rigid wire frame 14 is considered to be a first end 42 of the handle 16, even though the separate rigid wires 32, 34, 36 and 38 that make up the handle 16 might be of different lengths.

FIG. 1 shows that the four separate rigid wires 32, 34, 36 and 38 are substantially co-planar and lie in a plane that is orthogonal to the plane of FIG. 1. FIG. 1 also shows that all four wires 32, 34, 36 and 38 extend upwardly from the frame section 40 where they are attached, to a first inflection point 44 whereat all four wires 32, 34, 36 and 38 bend away from the basket 10 and extend linearly along a distance 48 to a first intermediate point 48. Between the first intermediate point 48 and the first inflection point 44, all four wires 32, 34, 36 and 38 are substantially co-planar and substantially parallel to each other, as can be seen in FIG. 2 and FIG. 5. As shown in FIG. 1, the first straight section of the handle 16 that lies between the handle's point of attachment to the rigid wire frame 14 and the first inflection point 44, and the second straight section that lies between the first inflection point and the first intermediate point 46, are at an angle between them that is identified in FIG. 1 as angle θ.

As can be seen in FIG. 1, FIG. 2 and FIG. 5, two interior rigid wires 34 and 36 of the handle 16, extend from their respective points of attachment to the rigid wire frame section 40, upwardly to the first inflection point 44. The two interior rigid wires 34 and 36 bend at the angle θ away from the frame 14 and continue linearly for a distance 48 to the first intermediate point 46. As can be seen in FIG. 1, FIG. 2 and FIG. 5, the two interior rigid wires 34 and 36 begin to diverge upwardly and away from the two exterior rigid wires 32 and 38 at the first intermediate point 46. The interior rigid wires 34 and 36 continue to gently bend upward to an apex, beyond which they begin to converge back toward the exterior rigid wire 32 and 38 until they "rejoin" the exterior rigid wires 32 and 38 at a second intermediate point 50 from which the four rigid wires 32, 34, 36 and 38 are again substantially co-planar until they reach the second end 52 of the handle 16.

As best seen in FIG. 5, the interior rigid wires 34 and 36 are shaped to resemble a curtate trochoid 54. At least one definition of "curtate trochoid" can be found in the publication entitled: "How to Say What Stuff Looks Like," written by Thomas Rieder, Copyright 1995, by Marcus Books, P.O. Box. 327, Queensville, Ontario, Canada. For purposes of this disclosure, however, the term "curtate trochoid" is considered to include other shapes, as set forth above in the Summary of the Invention.

The rigid wires can be shaped into a curtate trochoid 54 by a variety of methods. A "curtate trochoid" shape can be made by bending rigid wire around a mandrel. The rigid wire can also be pressed or stamped, rolled or molded.

As shown in FIG. 2 and FIG. 5, the curtate trochoid-shaped interior rigid wires 34 and 36 open downwardly, i.e., the opening of the curve faces downward. As is also shown in these figures, the exterior rigid wires 32 and 38 diverge downwardly at the first intermediate point to a minimum, then begin to converge upwardly, toward the interior rigid wires 34 and 36 until they re-converge with the interior rigid wires 34 and 36 at the second intermediate point 50. Like the interior rigid wires 34 and 368, the exterior rigid wires 32 and 38 in the embodiment shown in FIGS. 1, 2 and 5 are in the shape of a "curtate trochoid" but the curtate trochoids 54 of the exterior rigid wires 32 and 38 in these figures open upwardly.

The opposing curvatures of the upwardly and downwardly opening curtate trochoids 54 in the handle 16 provide a more ergonomic grip because the curtate trochoid 54 provides a protuberance 55 in the handle 16 against which a person can place his or her thumb while holding the handle 16. The upper or top protuberance 55 formed by the curtate trochoid 54 in the interior wires 34 and 36 makes the handle 16 easier to control, especially when the fry basket 10 is loaded. When a person's fingers are wrapped around the handle 16, the increased height of the protuberance 55 above the handle 16 allows a thumb to apply more force, with less muscle strength, than would be possible using a handle 16 that is straight along its entire length.

While the preferred embodiment of the handle 16 uses one or more interior rigid wires 34 and 36 having downwardly-opening curtate trochoids 54 and two or more exterior rigid 32 and 38 wires having upwardly opening curtate trochoids 54 as shown in FIG. 5, one alternate embodiment uses exterior rigid wires 32 and 38 that are substantially straight from the first inflection point to the second end 20 of the handle 16. Depiction of substantially straight exterior rigid wires, used in such an alternate embodiment, is omitted for brevity as the meaning of straight rigid wires and the meaning of substantially straight rigid wires are terms that are well-understood by those of ordinary skill in the art.

The preferred embodiment also uses at least two interior rigid wires 34 and 36 that are side-by-side. The shape of both such wires conforms to each other to provide a wider surface area of the protuberance 55. One alternate embodiment, however, uses a single interior rigid wire 26 formed to have a curtate trochoid 54. In such an alternate embodiment, the surface area of the protuberance 55 formed by the curtate troichoid 54 can be effectively increased by using a larger-diameter rigid wire, or using a rectangular bar stock instead of a round wire.

As for the exterior rigid wires 32 and 38, the preferred embodiment uses at least one such exterior rigid wire 32 and 38 on either "side" of the interior rigid wires 34 and 36. As is well known, round wires do not have "sides" per se, for purposes of this disclosure however, a round rigid wire has a "side," identifiable by how the several rigid wires are arranged and connected to each other in the figures. In particular, FIG. 1 and FIG. 2 show that the handle 16 has a straight segment 48 wherein the four rigid wires 32, 34, 36 and 38 are substantially co-planar, lying next to each other to form a substantially planar segment 49 of the handle 16 that lies between the first inflection point 44 and the first intermediate point 46. In this planar segment 49, a wire's side is considered to be a strip or line along a wire's exterior surface that lies in a geometric plane that is oriented to be substantially orthogonal to the geometric plane in which all four wires 32, 34, 36 and 38 lie. In each of the figures, the lengths of the substantially round rigid wires that are next to each other are considered to be arranged "side-by-side."

Figure 6:
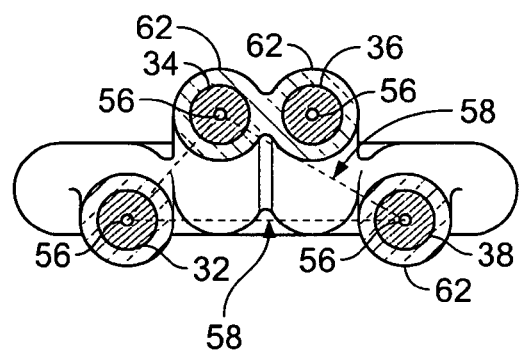
FIG. 6 is a cross-section of the handle, through the handle contour, showing the generally triangular shape of the contour's cross section.

To further describe the geometric relationship of the rigid wires that provide contoured handle 16, FIG. 6 shows the rigid wires 32, 34, 36 and 38 of the handle shown in FIGS. 1, 2 and 5 in cross section. In particular, the section lines 6-6 shown in FIG. 5 depict the location along the handle where the FIG. 6 cross section is taken.

Each of the rigid wires 32, 34, 36 and 38 used in the preferred embodiment has a substantially round cross section. As such, each wire 32, 34, 36 and 38 has a central axis 56.

Between the first intermediate point 46 and the second intermediate point 50, the cross-section of the handle is generally triangular. As shown in FIG. 6, however, the central axis 56 of the two exterior rigid wires 32 and 38, and the central axis of either one of the interior rigid wires 34 and 36, lie on the apexes of a triangle 58. Therefore, it can be said that first, second and third wires (e.g., wires identified by reference numerals 32, 34 and 38, or the wires identified by the reference numerals 32, 36 and 38) have axes 56, the locations of which lie substantially on the apexes of a triangle 58, at cross sections through the wires that are taken between the first intermediate point 46 and the second intermediate point 50.

Those of ordinary skill in the art will recognize the locations of the wires' axes 56 shown in FIG. 6 will depict the axes 56 in the aforementioned alternate embodiment that uses substantially straight exterior rigid wires 32 and 38 between the first intermediate point 46 and the second intermediate point 50. In such an alternate embodiment, first, second and third wires used in the handle 16 will also have central axes 56, the locations of which lie substantially on apexes of a triangle 58 at cross sections taken between the first intermediate point 46 and the second intermediate point 50.

As stated above, the wires 32, 34, 36 and 38 of the handle are preferably welded to the rigid wire frame 14. Those of ordinary skill will appreciate that MIG, TIG and "heli-arc" welds are just three types of welds that can be used to attach the handle 16 wires to the frame 14. Regardless of the type of weld, the handle 16 should be attached to the rigid wire frame 14 so that the wires of the handle 16 are attached to the rigid wire frame 14 to have a shear strength of at least 500 pounds.

Figure 7:
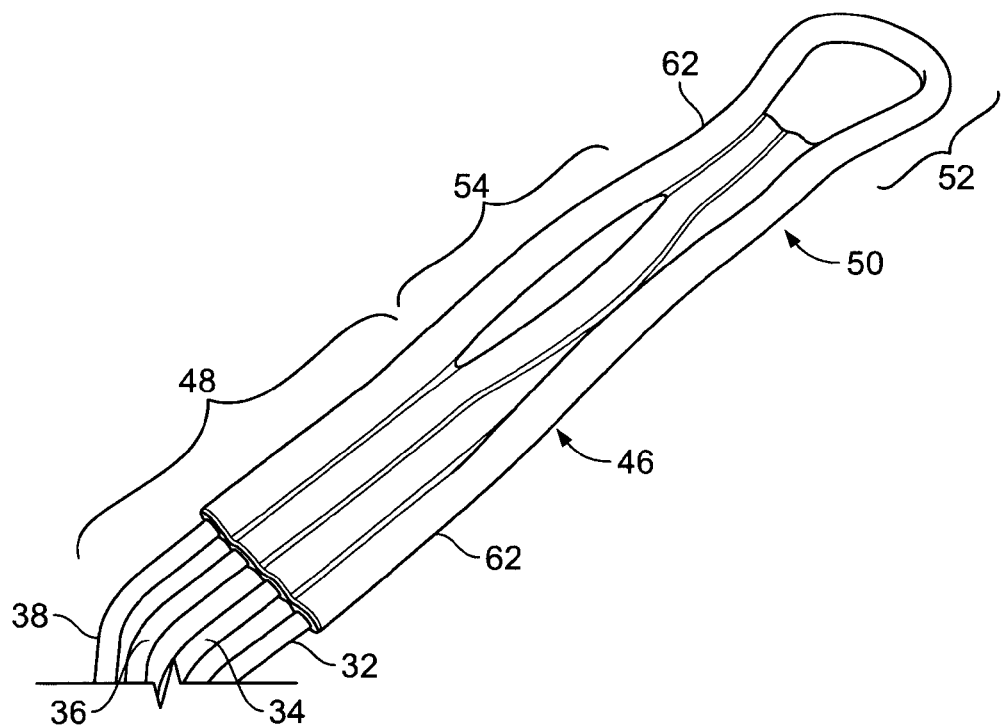
FIG. 7 is an enlargement of the handle, showing an alternate embodiment of the handle contour.

Although the preferred embodiment of the contoured handle has interior wires that curve and protrude upwardly above the handle and exterior wires that curve and protrude downwardly below the handle, some people might prefer the grip provided by the alternate embodiment depicted in FIG. 7. In this figure, the interior wires 34 and 36 are curtate trochoids 54 that open up. Conversely, the exterior rigid wires 32 and 38 are curtate trochoids that open downwardly.

In addition to the rigid wire corner protectors 61, 63, 65 and 67 and the contoured handle 16, the fry basket 10 shown in the figures is also provided with a rigid wire hook 60. As shown in FIG. 1, the rigid wire hook 60 is connected to the rigid wire frame, preferably by welding, at a position substantially opposite the rigid wire handle. Since the handle 16 and the hook 60 need to support the same load, the rigid wire hook should be attached to the rigid wire frame in such a way that it also has a shear strength of at least 500 pounds.

A still additional feature of the fry basic with the ergonomic handle is a handle coating 62 shown in FIG. 2 as covering the handle from the second end 52, over the contoured portion that includes the curtate trochoids, to just below the first inflection point 44. FIG. 6, which shows the wires in cross section, also shows the coating that is identified by reference numeral 62. In a preferred embodiment, the coating is selected to be a polyethylene or other plastic material that provides increased friction and insulation from heat that is conducted through the wires from a deep fryer.

Figure 8:
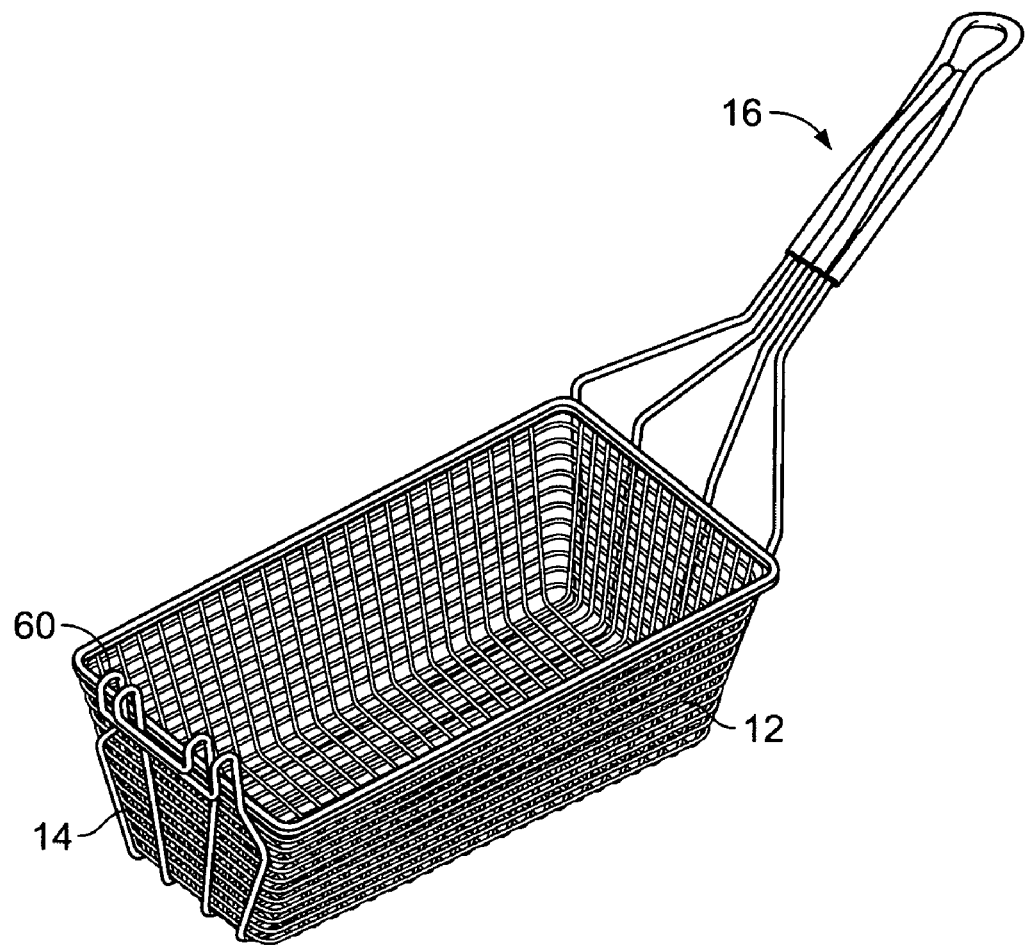
FIG. 8 is another embodiment of a basket having a contoured handle but including a frame opposite the handle with a contoured hook.

Finally, FIG. 8 shows another embodiment of a fry basket but with the frame 14 portion that is opposite the handle 16, contoured so as to narrow the hook 60. In the preferred embodiment, the hook 60 as shown in FIG. 8 is approximately four inches wide whereas the width of the wire mesh basket can be approximately six to twelve inches wide (where the "width" is the dimension of the fry basket as measured orthogonal to the length of the handle 16.

By narrowing the hook 60 as shown, the basket is better able to fit within some pre-existing deep fryers that the hook shown in FIGS. 1-7 might not fit into. The basket can also be easier to manipulate in a deep fryer when trying to hang the basket 10 over a deep fryer edge.

An in-frame, wire fry basket with an ergonomic handle protects the relatively fine-gauge wire mesh basket from damage using rigid wire segments that run outside and along the corners of the wire mesh basket. The wire fry basket is more usable by a contoured handle provided by curved sections in the handle. A rigid wire hook enables the basket to be hung on an inside or outside edge of deep fryer, allowing hot oil to drip from cooked foods. Finally, a protective and insulate coating provides an improved grip.

What is claimed is:

1. A fry basket comprising:
   a wire mesh basket having a length and a width;
   a rigid wire frame supporting the wire mesh basket; and
   a handle comprised of a plurality of rigid wires joined together and which have a first end coupled to the rigid wire frame and a second end located away from the first end, at least one of the plurality of rigid wires having a single curtate trochoid-shaped intermediate section located between the first and second ends, the curtate trochoid shape opening downwardly, to provide an ergonomic handle having an upwardly curving surface against which the thumb of a user can be placed while holding the fry basket.

2. The fry basket of claim 1, wherein the rigid wire handle is comprised of:
   a. a first rigid wire extending between the rigid wire frame and a first intermediate point of the handle, proximate to which the first rigid wire is deformed to be substantially curtate trochoid-shaped, the substantially curtate trochoid shaped portion running to a second intermediate point of the handle that is proximate to the handle's second end, said curtate trochoid-shape portion opening downwardly;
   b. a second rigid wire extending from the rigid wire frame to the handle's second end, said second rigid wire running at least part way along the first rigid wire on a first side of the first rigid wire, said second rigid wire extending between the first and second intermediate points on the first side, to the handle's second end;
   c. a third rigid wire extending from the rigid wire frame to the handle's second end, said third rigid wire running at least part way along the first rigid wire on a second side of the first rigid wire that is substantially opposite the first side of the first rigid wire, said third rigid wire extending between the first and second intermediate points on the second side, to the handle's second end.

3. The fry basket of claim 2, wherein the second and third rigid wires are deformed between the first and second intermediate points to be upwardly-opening curtate trochoid shapes.

4. The fry basket of claim 2, further comprised of a fourth rigid wire that is adjacent to and which conforms to the shape of the first rigid wire and which is located between the first and second rigid wires.

5. The fry basket of claim 1, wherein the handle's first end is attached to the rigid wire frame to have a shear strength of at least 500 pounds.

6. The fry basket of claim 5, wherein the rigid wire handle and the rigid wire frame are welded together.

7. The fry basket of claim 1, wherein:
   a. the wire mesh basket is formed to have a plurality of corners;
   b. the rigid wire frame is formed to protect the wire mesh basket corners by at least one rigid wire section that lies along each corner of the wire mesh basket, and outside of the wire mesh basket.

8. The fry basket of claim 1, further including at least one rigid wire hook, connected to the rigid wire frame at a position substantially opposite the rigid wire handle.

9. The fry basket of claim 1, wherein the at least one rigid wire hook is attached to the rigid wire frame.

10. The fry basket of claim 9, wherein the rigid wire hook and the rigid wire frame are welded.

11. The fry basket of claim 8, wherein the rigid wire hook has a width less than the width of the width of the wire mesh basket.

12. The fry basket of claim 11 wherein the rigid wire hook is approximately four inches wide.

13. The fry basket of claim 1, wherein said rigid wire handle is further comprised of a plastic coating that covers at least part of the rigid wire handle.

14. The fly basket of claim 1, wherein said rigid wire handle is further comprised of a plastic coating that covers at least part of the curtate trochoid-shaped section.

15. The fry basket of claim 1, wherein the curtate trochoid-shape of the intermediate section opens upwardly.

16. The fry basket of claim 2, wherein the substantially curtate trochoid-shaped portion of the first wire opens upwardly.

17. The fry basket of claim 3, wherein the curtate trochoid-shaped sections of the second and third rigid wires opens downwardly.

18. A fry basket comprising:
   a. a wire mesh basket having an open top, a length and a width and a plurality of corners;
   b. a rigid wire frame around the wire mesh basket exterior and supporting the wire mesh basket, the rigid wire frame having rigid wire sections that protect the wire mesh corners by being located proximate to the wire mesh basket corners; and
   c. a rigid wire handle formed from at least first, second and third rigid wires, said first, second and third rigid wires being attached to the rigid wire frame, the rigid wire handle having a first intermediate point and a second intermediate point, between which the first rigid wire is shaped to substantially conform to the shape of a curtate trochoid that opens downwardly, said second and third rigid wires being on opposite sides of the first rigid wire and extending through the first and second intermediate points.

19. The fly basket of claim 18, wherein the second and third rigid wires are shaped between the first and second intermediate points to be upwardly-opening curtate trochoid shapes.

20. The fry basket of claim 18, wherein the first, second and third rigid wires are attached to the rigid wire frame to have a shear strength of at least 500 pounds.

21. The fly basket of claim 20, wherein the first, second and third rigid wires are welded to the rigid wire frame.

22. The fry basket of claim 18, further including at least one rigid wire hook, connected to the rigid wire frame at a position substantially opposite the rigid wire handle.

23. The fry basket of claim 22 wherein the at least one rigid wire hook is attached to the rigid wire frame to have a shear strength of at least 500 pounds.

24. The fly basket of claim 23, wherein the rigid wire hook and the rigid wire frame are welded.

25. The fry basket of claim 22, wherein the rigid wire hook has a width less than the width of the width of the wire mesh basket.

26. The fry basket of claim 25 wherein the rigid wire hook is approximately four inches wide.

27. The fry basket of claim 18, wherein said rigid wire handle is further comprised of a plastic coating that covers at least part of the rigid wire handle.

28. The fry basket of claim 18, wherein said rigid wire handle is further comprised of a plastic coating that covers at least part of the curtate trochoid-shaped section.

* * * * *